US008760457B2

(12) United States Patent
Bourd et al.

(10) Patent No.: US 8,760,457 B2
(45) Date of Patent: Jun. 24, 2014

(54) DATA ACCESS TOOL FOR PROGRAMMABLE GRAPHICS HARDWARE

(75) Inventors: Alexei V. Bourd, San Diego, CA (US); Guofang Jiao, San Diego, CA (US); Lin Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 982 days.

(21) Appl. No.: 11/782,509

(22) Filed: Jul. 24, 2007

(65) Prior Publication Data

US 2009/0027407 A1 Jan. 29, 2009

(51) Int. Cl.

*G09G 5/39* (2006.01)
*G06T 1/00* (2006.01)
*G06T 15/00* (2011.01)
*G06F 15/16* (2006.01)

(52) U.S. Cl.

USPC ........... 345/531; 345/574; 345/522; 345/502; 345/503

(58) Field of Classification Search

CPC ............................... G09G 5/363; G09G 5/393
USPC ......... 345/544, 556, 574, 501–506, 522, 531, 345/532; 34/544
See application file for complete search history.

(56) References Cited

U.S. PATENT DOCUMENTS

| | | | |
|---|---|---|---|
| 4,920,481 A * | 4/1990 | Binkley et al. | 703/26 |
| 5,450,543 A * | 9/1995 | Varga | 345/556 |
| 6,008,782 A * | 12/1999 | Chien | 345/28 |
| 6,407,736 B1 * | 6/2002 | Regan | 345/422 |
| 6,996,694 B1 * | 2/2006 | Muthukkaruppan | 345/543 |
| 7,215,344 B2 * | 5/2007 | Baldwin | 345/620 |
| 7,256,788 B1 * | 8/2007 | Luu et al. | 345/501 |
| 2005/0049729 A1 | 3/2005 | Culbert et al. | |
| 2005/0122334 A1 | 6/2005 | Boyd et al. | |
| 2005/0166007 A1 * | 7/2005 | Ono | 711/105 |

FOREIGN PATENT DOCUMENTS

| | | |
|---|---|---|
| EP | 0969370 | 1/2000 |
| EP | 1594091 A2 | 11/2005 |

OTHER PUBLICATIONS

Strengert Magnus et al., "A Hardware-Aware Debugger for the OpenGL Shading Language," Institute for Visualization and Interactive Systems, University of Stuttgart, 2007, <http://www.graphicshardware.org/previous/www_2007/presentations/strengert-opengldebugger-gh07.pdf>.
Taiwanese Search report—097128159—TIPO—Dec. 26, 2011.
International Search Report and Written Opinion—PCT/US2008/070917, International Search Authority—European Patent Office—Dec. 23, 2008.

* cited by examiner

*Primary Examiner* — Ke Xiao
*Assistant Examiner* — Robert Craddock
(74) *Attorney, Agent, or Firm* — James R. Gambale, Jr.

(57) ABSTRACT

Methods and apparatuses for accessing data within programmable graphics hardware are provided. According to one aspect, a user inserts special log commands into a software program, which is compiled into instructions for the programmable graphics hardware to execute. The hardware writes data to an external memory during runtime according to a flow control protocol, and the software driver reads the data from the memory to display to the user.

32 Claims, 3 Drawing Sheets

200 Set memory buffer access parameters
202 Calculate write memory address
204 Has entry been read?
NO
206 Sleep for number of cycles
YES
208 Write data to write memory address

DATA ACCESS TOOL FOR PROGRAMMABLE GRAPHICS HARDWARE

TECHNICAL FIELD

The disclosure relates to programmable graphics hardware. In particular, the disclosure relates to techniques for efficient debugging of software that runs on programmable graphics hardware.

BACKGROUND

A recent trend in the manipulating and displaying of real-time 3D graphics is the increasing use of programmable graphics hardware. Such hardware is characterized by the presence of multiple programmable hardware stages, known as "shaders," arranged in a pipeline. In contrast with "fixed," or non-programmable hardware, each hardware stage in a programmable hardware pipeline can be programmed to perform a desired computational function, allowing for increased flexibility in the design of graphics algorithms. Examples of shaders include geometry shaders, vertex shaders, and pixel shaders.

When designing and debugging shader programs, a programmer may find it useful to access and view the runtime values of a shader's internal register and ALU (arithmetic logic unit) variables. This may be difficult, however, as there is usually no mechanism by which a shader's internal values can be transferred to an external location accessible to the programmer, such as an external memory module.

One possible approach is to purposefully assign the value of an internal variable of interest to the color of an outgoing pixel, send this pixel to the pixel blender block, wait until the pixel is drawn on a screen, and then inspect the color of the drawn pixel. While this approach takes advantage of an already existing pathway inside the shader, it has several disadvantages. First, it would be easier for the programmer if the value of the internal variable were displayed in its native format (e.g., floating point, integer, etc.), rather than as the color of a pixel on a screen. Second, the internal graphics pipeline might not be able to deliver the value of the pixel color unmodified to the screen buffer, leading to a problem with precision. For example, the pixel color could be 32-bit floating point, while the screen buffer for a particular monitor might only support 8-bit integer precision. In this case, it may be impossible to ascertain the actual value of an internal shader variable based solely on pixel color. Third, the above technique may be very cumbersome for a vertex shader, since the vertex shader is usually followed by a fragment shader. In this case, the fragment shader would need to be replaced by a "dummy" pass-through shader so that the values generated within the vertex shader can be passed unmodified to a screen buffer.

What is needed is a debugging tool having a simple user interface that allows programmers to easily and reliably ascertain the values of internal shader variables during runtime in programmable graphics hardware.

SUMMARY

One aspect of the present disclosure provides a method for transferring graphics processor unit (GPU) data to a memory buffer, the method comprising determining a base address and a number of sleep cycles; counting a number of vertices or pixels processed to derive an offset; deriving a memory address based on the base address and said offset; checking if the entry corresponding to said memory address has been read; if the entry has been read, writing data to said memory address; and if the entry has not been read, waiting said number of sleep cycles before performing said checking again.

Another aspect of the present disclosure provides an apparatus comprising a counter for counting a number of vertices or pixels processed to derive an offset; and a processor configurable to determine a memory address based on a base address and said offset, the processor further configurable to verify that an entry corresponding to said memory address has been read before writing data to said memory address, the processor further configurable to wait a number of sleep cycles if it is determined that the entry has not been read.

Another aspect of the present disclosure provides a computer program product, comprising computer-readable medium comprising code for causing a computer to determine a base address and a number of sleep cycles; code for causing a computer to count a number of vertices or pixels processed to derive an offset; code for causing a computer to derive a memory address based on the base address and said offset; code for causing a computer to check if the entry corresponding to said memory address has been read; code for causing a computer to write data to said memory address if the entry has been read; and code for causing a computer to wait said number of sleep cycles if the entry has not been read.

Another aspect of the present disclosure provides a method for transferring a runtime variable of a graphics processing unit to a user, the method comprising compiling software code into instructions for the graphics processing unit, the software code comprising a log command specifying a variable name; transferring the value of a variable corresponding to said variable name from the graphics processing unit to an external memory according to a memory flow control protocol; retrieving the value of said variable from said external memory; formatting said retrieved value of said variable; displaying said formatted value of said variable to the user.

DETAILED DESCRIPTION

Disclosed herein are tools and techniques for allowing programmers easier access to internal shader variables during runtime. These include techniques for transferring data from internal shader variables to an externally accessible memory buffer. Disclosed also are a structure and a protocol for handling the memory buffer to allow reliable buffered delivery of data from the shader ALU to a software driver.

Figure 1:
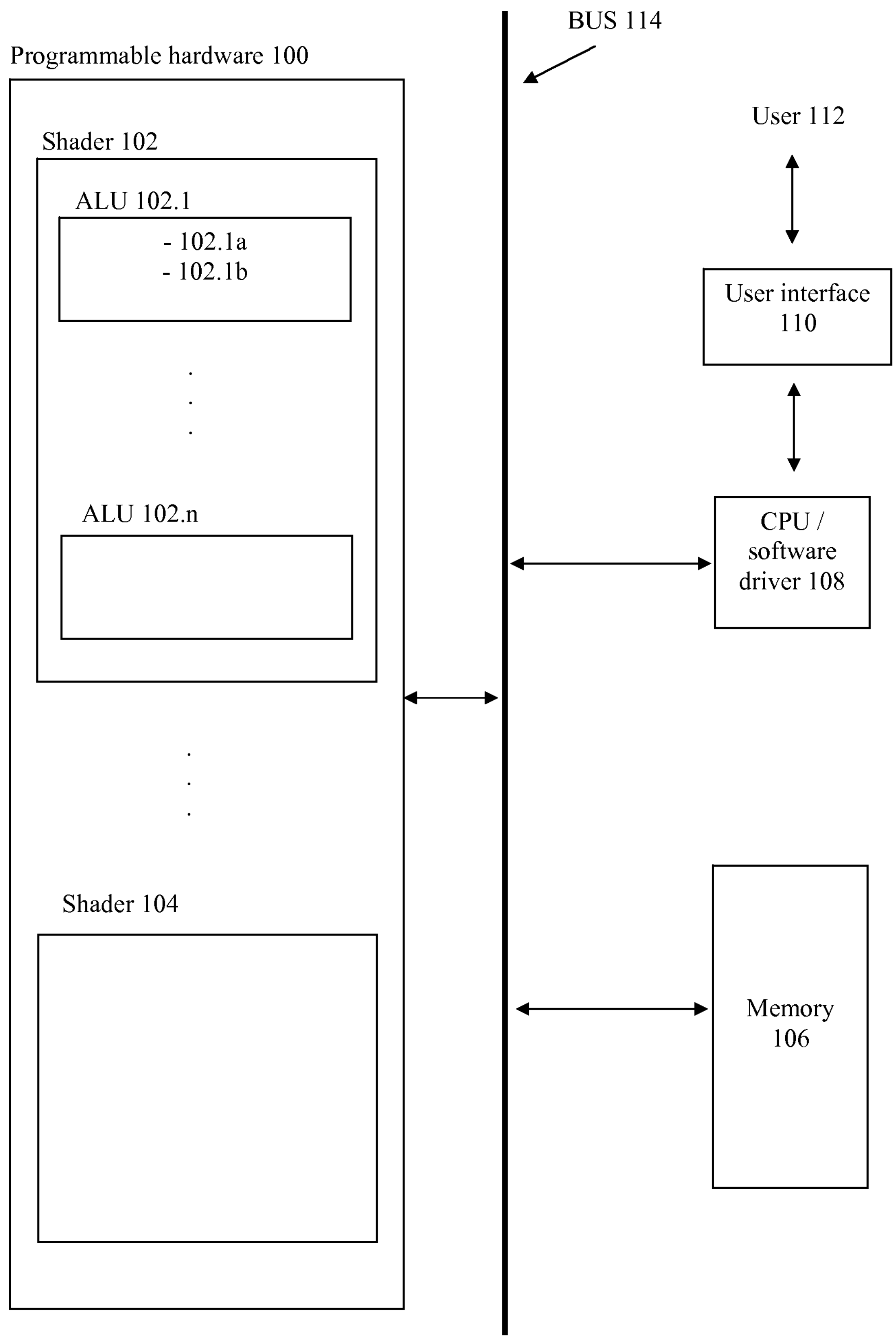
FIG. 1 shows an embodiment of a programmable graphics hardware system.

FIG. 1 shows an embodiment of a programmable graphics hardware system. A programmable graphics hardware unit 100 can have several shaders 102, 104. In one embodiment, there can be a pixel shader and a fragment shader. In other embodiments, there may be more than two shaders. Each shader may include multiple internal ALUs 102.1 through **102.*n*, each ALU processing multiple internal variables. For example, ALU 102.1 processes internal variables 102.1*a* and 102.1*b*. The ALU 102.1** may interface to an off-chip memory 106 via a bus 114. The ALU 102.1 may be configured to read and write data to the memory 106 via the bus 114.

Via the bus 114, off-chip memory 106 is also accessible by a software driver 108, which can read the data stored in memory 106. The software driver 108 communicates with a user interface 110, which is provided to a programmer or user 112. The software driver 108 also communicates directly with programmable hardware 100 via the bus 114.

In an embodiment, the user 112 programs software code through user interface 110. The code defines the functionality to be performed by the shader 102, and is written using commands as specified in a high-level shader language specification such as Open GL ES Shading Language. A compiler (not shown) compiles the code into low-level hardware instructions that can be supplied to the shader 102 via software driver 108.

In an embodiment, the user 112 can embed special log commands into the software code which instruct the shader to output the values of specified internal shader variables during runtime to an externally accessible location for access by the user 112. In an embodiment, the log command allows the user 112 to specify the name of the internal shader variable to be logged, the data type of the variable (e.g., whether the variable is 32-bit floating point or 8-bit integer), as well as a character string that can be used to attach descriptive information to the logged variable.

In an embodiment, the log command is called an "shprintf" function, and takes the following format:

void shprintf(char*label, int data_type, variable);

where "label" points to a character string which can be up to 3 characters long in an embodiment, and can describe the variable to be logged;

where "data_type" is an integer specifying one of the following data types: unsigned char (8-bit), signed char (8-bit), unsigned short (16-bit), signed short (16-bit), unsigned int (32-bit), signed int (32-bit), float16, float24, float32, or any other data type(s) that might be supported by the architecture;

and where "variable" refers to any attribute, varying or temporary, that exists in the shader.

Figure 2:
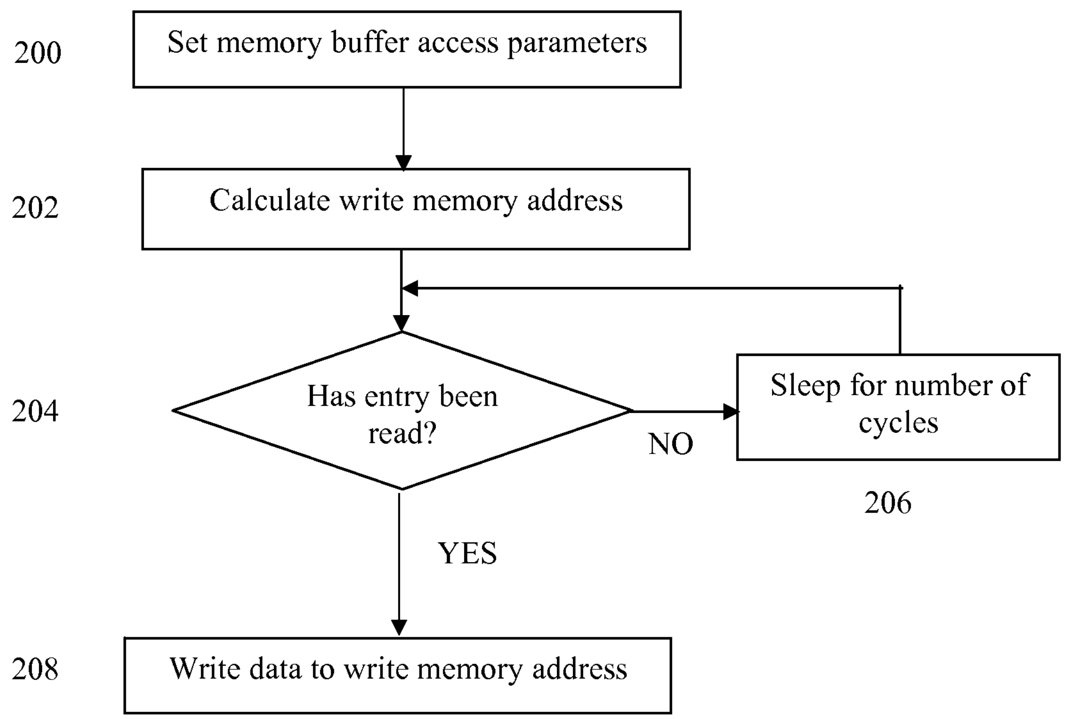
FIG. 2 shows an embodiment in which a shader ALU, running hardware instructions derived from the software code written by user 112 in FIG. 1, transfers values from internal ALU variables to an externally accessible memory buffer.

FIG. 2 shows an embodiment in which a shader ALU, running hardware instructions derived from the software code written by user 112 in FIG. 1, transfers values from internal ALU variables to an externally accessible memory buffer.

In step 200, the ALU is initially provided with certain parameters relating to memory buffer access. In one embodiment, these parameters include the address of the buffer (BUF_ADDR), the length of a block (BLK_LEN) as measured in number of buffer entries, the total length of the buffer (BUF_LEN) as measured in buffer entries, and the number of cycles to sleep between attempts to write to the buffer (SLEEP_CYCLE_CNT). In one embodiment, these parameters may be automatically generated uniforms, i.e., run-time objects with the same global state, provided from the software driver to the shader. In one embodiment, the compiler automatically generates these uniforms when it detects the presence of the special log commands in the software code.

In an embodiment, each entry of the memory buffer array can hold a 64-bit word. In other embodiments, each entry can be 128 bits, 256 bits, or any other size. In one embodiment, the number of 64-bit words in the array is a power of two to simplify bit handling in the shader. In an embodiment, the software driver initializes the buffer to all zeroes. The buffer may be subdivided into equally-sized blocks. The size of the buffer and the size of blocks may be controlled at run-time by the software driver as described earlier. The collection of blocks can treated in a circular manner, i.e. the last block may be followed by the first block.

In an embodiment, each entry of the memory buffer array contains information on a dirty bit, a carriage return, a data type, a string label, and data contents. The dirty bit of an entry can indicate whether the contents of the entry have already been read out. The carriage return can indicate whether the corresponding variable is to be displayed in the same line as a subsequent variable. The data type can indicate the data type of the corresponding data contents for display formatting. The string label can identify the data contents. The data contents contain the actual value of the variable of interest.

In an embodiment, the bits of an entry can be allocated as follows:

| Dirty Bit | Carriage Return | Data Type | String label | Data Contents |
|---|---|---|---|---|
| 1 bit | 1 bit | 6 bits | 24 bits | 32 bits |

Subsequent to being provided the memory buffer access parameters in step 200, the shader ALU can proceed to implement a flow control algorithm to make sure the shader memory accesses do not overtake the software driver memory accesses, as illustrated in steps 202-208.

In step 202, the ALU determines an address in the memory buffer to which data will be written. The address may be determined as an offset value from the parameter BUF_ADDR, and may be calculated by simply adding the offset to BUF_ADDR. The offset may be derived from a special counter register in the ALU 102.1 that tracks the number of vertices (or pixels, depending on the function of the shader) for which data has already been written to the memory buffer. This may be useful because a single ALU may process multiple vertices (or pixels) in parallel threads, and thus a call to shprintf for one variable may generate multiple instances of data corresponding to the multiple instances of that variable in the parallel threads. The vertex or pixel counter can provide a way to separate each instance of a variable within the memory buffer.

In an embodiment, the programmer can then determine which data in the memory corresponds to which vertex or pixel according to the following. For the vertex shader, the programmer can readily determine the order in which the vertices are processed by the shader, since the order in which vertices are sent to the shader is generally pre-determined by the application. For a pixel shader, however, the programmer might not know the order of pixels processed. In this case, if the programmer needs to know which pixel corresponds to which value stored in memory, the programmer can simply use the aforementioned log command to display the pixel data along with a field identifying the pixel, such as pixel position. For instance, in Open GL ES Shading Language, there are special variables that hold pixel position such as glFragCoord.x and glFragCoord.y.

The vertex or pixel counter could, for instance, be a 32-bit number that is initialized to zero at power up. In an embodiment, the value held by the counter is referred to as pixelCnt. In one embodiment, the offset value is calculated as pixelCnt & (BUF_LEN−1), where pixelCnt is the counter value referred to earlier, & is a logical AND operation, and BUF_LEN is the total length of the buffer in entries. Note that performing a logical AND operation on the value of BUF_LEN−1 allows circular addressing of the memory buffer up to BUF_LEN−1.

In step 204, the shader ALU checks the dirty bit of the entry corresponding to the memory address to be written to. If the dirty bit is set, this means that the entry has not been processed, and so the shader ALU stalls. In an embodiment, the shader ALU stalls by entering a sleep state, during which execution of the shader program is halted for a period of time. At the end of SLEEP_CYCLE_CNT number of cycles, the shader ALU wakes up and checks the dirty bit again. If the dirty bit is cleared, this means that the entry has been processed, and the shader ALU can proceed to step 208, where the shader ALU writes new data to that memory address.

In an embodiment, the steps depicted in FIG. 2 can be implemented using the following pseudo-code, wherein BUF_LEN and BLK_LEN are assumed to be powers of two:

```
offset = pixelCnt & (BUF_LEN−1);
 if ( (offset & (BLK_LEN−1)) == 0) {
     Dirty = LOAD ( BUF_ADDR + offset);
     While (Dirty & 1) {
      Sleep SLEEP_CYCLE_CNT;
      Dirty = LOAD (BUF_ADDR + offset);
     }
}
STORE (BUF_ADDR+offset, value)
```

In the pseudo-code, the function LOAD returns the bits of the entry corresponding to the memory address specified, and the function STORE writes a specified value to the corresponding memory address. The line "if ((offset & (BLK_LEN−1))===0)" in the pseudocode instructs the shader to perform the dirty-bit check on a per-block basis rather than on a per-entry basis, which may be useful as the LOAD operation for the check may tend to slow the process down. In an alternative embodiment, however, the check can also be performed on a per-entry basis.

Figure 3:
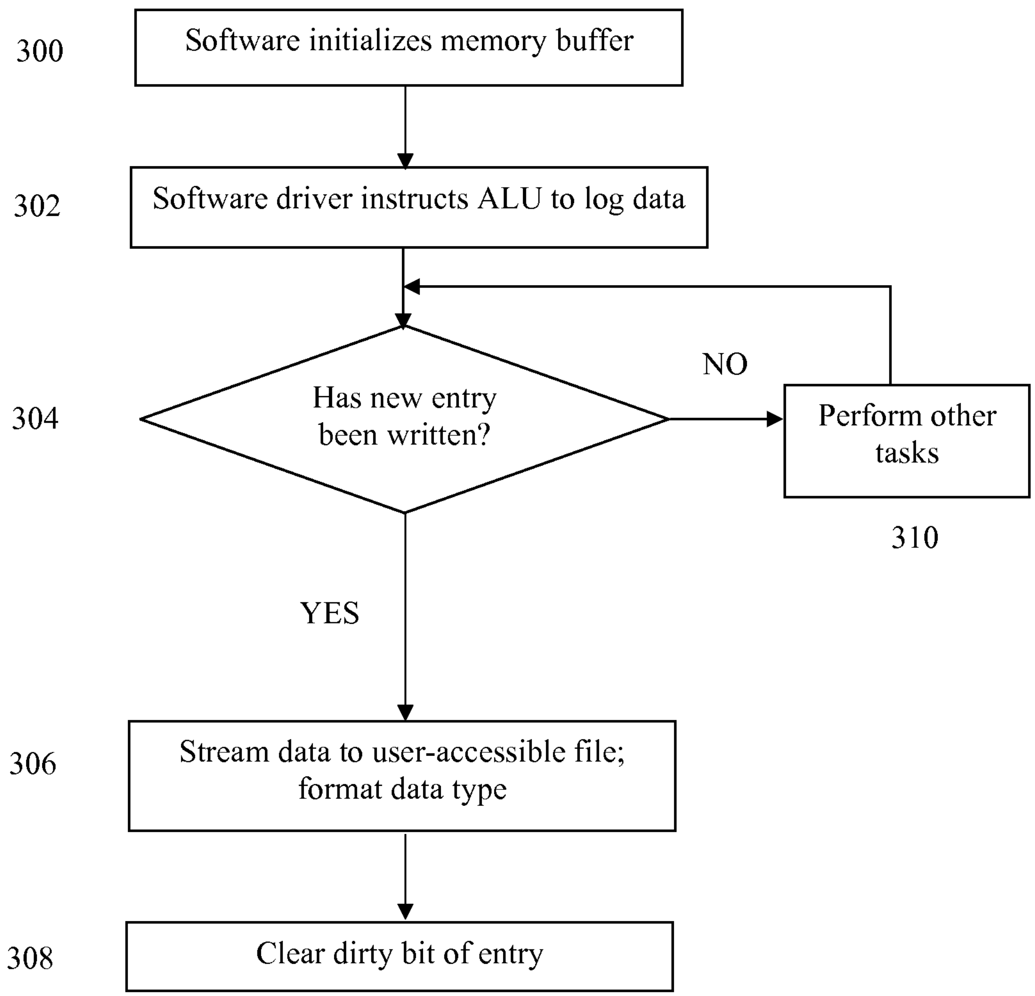
FIG. 3 shows an embodiment in which a software driver accesses the memory buffer entries written to by the shader ALUs.

FIG. 3 shows an embodiment in which a software driver accesses the memory buffer entries written to by a shader ALU in FIG. 2.

In step 300, the software driver initializes the memory buffer to all zeroes. In step 302, the software driver instructs the ALU to log the desired data. In step 304, the software driver checks the entry corresponding to the memory address written to determine if the dirty bit is set. If the bit is not set, this indicates that the memory address has not yet been written to, and the software driver will perform some other tasks 310, and check back at a later time.

If the bit is set, then the algorithm proceeds to step 306, where the software driver accesses the contents of the memory and streams the data to a user-accessible file. In an embodiment, the facility that saves the log file can be an on-board file system, network communication layer for transmitting the information to a server, etc. In one embodiment, the software driver also converts the data into an appropriate format based on the data type of the value. In step 308, the software driver clears the dirty bit of the first entry of the block, indicating to the shader that that block of the memory buffer can be stored with new data.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The invention claimed is:

1. A method comprising:

transferring, by a graphics processor unit (GPU), shader variable data to a memory buffer external to the GPU, wherein transferring the shader variable data comprises:

determining, by the GPU, a base address and a number of sleep cycles;

counting, by the GPU, a number of vertices or pixels processed to derive an offset;

deriving, by the GPU, a memory address based on the base address and said offset;

checking, by the GPU, if an entry corresponding to said memory address has been read by a second, different processor unit;

if the entry has been read by the second processor unit, writing, by the GPU, the shader variable data to said memory address; and if the entry has not been read by the second processor unit, waiting, by the GPU, said number of sleep cycles before performing said checking again.

2. The method of claim 1, the memory buffer being a circular buffer having a buffer length.

3. The method of claim 1, the memory buffer divided into equally sized blocks, each block having a number of entries which is an integer power of two.

4. The method of claim 3, the shader variable data written to a representative memory address within each block, the shader variable data written to said representative memory address comprising a dirty bit to indicate whether the corresponding block has been read, the checking comprising checking the value of said dirty bit of said representative memory address, the method further comprising resetting the value of said dirty bit when the shader variable data is written to said block.

5. The method of claim 1, the shader variable data written to said memory address comprising a dirty bit to indicate whether an entry has been read, the checking comprising checking the value of said dirty bit, the method further comprising resetting the value of said dirty bit when the shader variable data is written to said memory address.

6. The method of claim 1, the shader variable data written to said memory address comprising a carriage return bit.

7. The method of claim 1, the shader variable data written to said memory address comprising shader variable data contents, a data type corresponding to said shader variable data contents, and a string label corresponding to said shader variable data contents.

8. The method of claim 1, wherein writing the shader variable data to the said memory address comprises writing the shader variable data in a native data format.

9. The method of claim 1, wherein the shader variable data comprises at least one of an integer value and a floating point value.

10. The method of claim 1, wherein the shader variable data comprises at least one of:

internal register data of a GPU shader and arithmetic logic unit (ALU) variable data of the GPU shader.

11. An apparatus comprising:

a counter for counting a number of vertices or pixels processed to derive an offset;

a processor configurable to determine a memory address of a memory buffer based on a base address and said offset, the processor further configurable to verify that an entry corresponding to said memory address has been read, by a second, different processor, before writing shader variable data to an entry in said memory buffer, the processor further configurable to wait a number of sleep cycles if it is determined that the entry has not been read by the second processor, wherein the memory buffer is external to a graphics processing unit (GPU) from which the shader variable data is written.

12. The apparatus of claim 11, the memory buffer being a circular buffer having a buffer length.

13. The apparatus of claim 11, the memory buffer divided into equally sized blocks, each block having a number of entries which is an integer power of two.

14. The apparatus of claim 13, the shader variable data written to a representative memory address within each block comprising a dirty bit to indicate whether that block has been read, the processor configurable to verify by checking the value of said dirty bit of said representative memory address, the apparatus further configurable to reset the value of said dirty bit when the shader variable data is written to said block.

15. The apparatus of claim 11, the shader variable data written to said memory address comprising a dirty bit to indicate whether an entry has been read.

16. The apparatus of claim 11, the shader variable data written to said memory address comprising a carriage return bit, shader variable data contents, a data type corresponding to said shader variable data contents, and a string label corresponding to said shader variable data contents.

17. The apparatus of claim 11, wherein to write the shader variable data, the processor is further configured to write the shader variable data in a native data format.

18. The apparatus of claim 11, wherein the shader variable data comprises at least one of an integer value and a floating point value.

19. The apparatus of claim 11, wherein the shader variable data comprises at least one of:

internal register data of a GPU shader and arithmetic logic unit (ALU) variable data of the GPU shader.

20. A graphics processor unit (GPU) comprising:

a counter for counting a number of vertices or pixels processed to derive an offset;

a processor configured to determine a memory address of a memory buffer based on a base address and said offset, the processor further configured to verify that an entry corresponding to said memory address has been read, by a second, different processor unit, before writing shader variable data to an entry in said memory buffer, the processor further configured to wait a number of sleep cycles if it is determined that the entry has not been read by the second processor unit, wherein the memory buffer is external to the GPU, from which the shader variable data is written.

21. The graphics processor unit (GPU) of claim 20 comprising:

means for generating an offset address for writing the shader variable data to said memory buffer; and means for writing the shader variable data to said memory buffer according to a flow control protocol.

22. The GPU of claim 20, wherein to write the shader variable data, the processor is further configured to write the shader variable data in a native data format.

23. The GPU of claim 20, wherein the shader variable data comprises at least one of an integer value and a floating point value.

24. The GPU of claim 20, wherein the shader variable data comprises at least one of:

internal register data of a GPU shader and arithmetic logic unit (ALU) variable data of the GPU shader.

25. A non-transitory computer-readable storage medium encoded with instructions that, when executed, cause one or more processors to:

transfer graphics processor unit (GPU) shader variable data to a memory buffer external to the GPU, wherein the instructions that cause the one or more processors to transfer the shader variable data comprise instructions that cause the one or more processors to:

determine a base address and a number of sleep cycles;

count a number of vertices or pixels processed to derive an offset;

derive a memory address based on the base address and said offset;

check if an entry corresponding to said memory address has been read by a second, different processor;

write the shader variable data to said memory address if said entry has been read by the second processor; and wait said number of sleep cycles if the entry has not been read by the second processor.

26. The non-transitory computer-readable medium of 25, wherein the instructions that cause the one or more processors to write the shader variable data to the said memory address further comprise instructions that cause the one or more processors to write the shader variable data in a native data format.

27. The non-transitory computer-readable medium of 25, wherein the shader variable data comprises at least one of an integer value and a floating point value.

28. The non-transitory computer-readable medium of 25, wherein the shader variable data comprises at least one of:

internal register data of a GPU shader and arithmetic logic unit (ALU) variable data of the GPU shader.

29. An apparatus comprising:

means configured for transferring graphics processor unit (GPU) shader variable data to a memory buffer external to the GPU comprising:

means configured for determining, by the GPU, a base address and a number of sleep cycles;

means configured for counting, by the GPU, a number of vertices or pixels processed to derive an offset;

means configured for deriving, by the GPU, a memory address based on the base address and said offset;

means configured for checking, by the GPU, if an entry corresponding to said memory address has been read by a second, different processor means;

means configured for writing, by the GPU, the shader variable data to said memory address if the entry has been read by the second processor means; and means configured for waiting, by the GPU, said number of sleep cycles before performing said checking again if the entry has not been read by the second processor means.

30. The apparatus of claim 29, wherein the means configured for writing the shader variable data to the said memory address further comprises means configured to write the shader variable data in a native data format.

31. The apparatus of claim 29, wherein the shader variable data comprises at least one of an integer value and a floating point value.

32. The apparatus of claim 29, wherein the shader variable data comprises at least one of:

internal register data of a GPU shader and arithmetic logic unit (ALU) variable data of the GPU shader.

* * * * *